(12) United States Patent
Hermann et al.

(10) Patent No.: US 8,057,630 B2
(45) Date of Patent: Nov. 15, 2011

(54) SELECTIVE CURE OF ADHESIVE IN MODULAR ASSEMBLIES

(75) Inventors: Weston Arthur Hermann, Palo Alto, CA (US); Scott Ira Kohn, Redwood City, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 127 days.

(21) Appl. No.: 12/716,249

(22) Filed: Mar. 2, 2010

(65) Prior Publication Data

US 2011/0214808 A1    Sep. 8, 2011

(51) Int. Cl.
    *B32B 37/00*    (2006.01)
(52) U.S. Cl. .................... 156/275.5; 228/901
(58) Field of Classification Search ............ 156/275.5; 228/58, 901; 428/116, 139, 188, 198, 200, 428/343; 15/192
    See application file for complete search history.

(56) References Cited

U.S. PATENT DOCUMENTS

| | | | | |
|---|---|---|---|---|
| 2005/0126093 A1* | 6/2005 | Wagner et al. | ............ | 52/204.53 |
| 2008/0149266 A1* | 6/2008 | Sanocki et al. | ............ | 156/275.5 |
| 2009/0023060 A1* | 1/2009 | Villanueva et al. | ............ | 429/156 |

* cited by examiner

Primary Examiner — Richard Crispino
Assistant Examiner — Elizabeth Royston
(74) Attorney, Agent, or Firm — Patent Law Offices of Michael E. Woods; Michael E. Woods

(57) ABSTRACT

Methods and systems for decreasing costs (expense, mass, and/or cure time) associated with use of adhesives when assembling modularized components, particularly for assemblies having many elements such as for example battery modules used in electric vehicles. The methods and systems enable use of high-wettability adhesives (defined generally in this application as low viscosity and/or low surface tension adhesives) for assembling such modularized components. A first method including (a) dispensing a high-wettability adhesive into a first module fixture populated with a plurality of elements wherein the first module fixture provides a plurality of bonding wells with each bonding well accepting a first portion of one or more of the elements with the module fixture including one more apertures communicated with one or more of the bonding wells, the adhesive being selectively curable upon application of a curing modality; (b) applying the curing modality selectively to a first portion of the dispensed adhesive in a seal zone, the seal zone including one or more regions surrounding the apertures wherein the dispensed adhesive in the seal zone is sufficiently cured to inhibit significant quantities of the adhesive from emerging from the apertures while the adhesive continues to be dispensed into the module fixture wherein the curing modality is not applied to a second portion of the adhesive outside of the seal zone; and (c) applying the curing modality to the second portion of the dispensed adhesive.

18 Claims, 4 Drawing Sheets

SELECTIVE CURE OF ADHESIVE IN MODULAR ASSEMBLIES

BACKGROUND OF THE INVENTION

The present invention relates generally to module construction for assemblies having several-to-many elements, and more specifically to systems and methods for use of selectively curable low viscosity/low surface tension adhesives for assembly construction, most particularly for battery module assembly construction.

It is common to produce module assemblies having elements secured together into an integrated monolithic structure. One method for securing the elements together uses an adhesive that bonds the elements to one or more fixtures. These fixtures typically include many openings that may be used to provide access to the elements, the inside of the assembly, or for other use. To inhibit adhesive from escaping from these openings during manufacture, conventional solutions use adhesives having great enough viscosity/surface tension to inhibit adhesive from exiting the apertures.

In many applications such an adhesive provides an acceptable solution. In other applications, an adhesive like this is problematic. One problem is that the viscosity/surface tension requires a fairly large hydrostatic head in order to direct a suitable quantity of adhesive into small margin bonding areas to adequately wet the bonding surfaces and provide sufficient bond strength. This hydrostatic head represents a large quantity of adhesive that is "wasted" in the sense that it does not contribute to the security of the bonding between the elements and the fixture.

It is not only the case that this adhesive is expensive and therefore any wasted adhesive adds to the ultimate cost. In some applications, like electric vehicles, a further drawback is that excessive adhesive adds "unnecessary" mass to the final assembly while also being unnecessarily expensive. As the number of elements in the assembly increases, and as a packing density of the elements increases, the costs in terms of expense and mass become quite significant because of the multiplicative accumulation of individual excess across all the elements in all of the modules. Any savings in reducing the quantity of adhesive per element/module is extremely effective in these cases as it reduces both expense and mass.

Adhesives have an associated curing profile that further influences the use and suitability of adhesives in module assemblies. There are two broad categories of adhesives— one-part adhesives and two-part adhesives. Two-part adhesives are adhesives that include a base and a hardener. In contrast, a one-part adhesive includes the functionality of both the base and the hardener, but the activation or release of the hardener depends upon some externality for curing (e.g., temperature, ultraviolet radiation, water vapor in the environment, and the like). Epoxy is an example of a two-part adhesive having a resin and a hardener, with the hardener accelerating a polymerization (i.e., curing) of the adhesive, the specifics of the curing can be influenced by temperature and choice of resin(s) and hardener(s). Whether one-part or two-part, each adhesive has a curing modality that produces a rigid and strong bond in response to one or more curing agents. A cure time, particularly a minimum cure time to reach sufficient mechanical integrity for further processing, is an additional cost of use of adhesives. The cure time is sometimes related to the total quantity of adhesive used, using less adhesive can sometimes improve cure time cost.

Further, in order for each battery module to remain mechanically robust in harsh environments such as within an automobile, a structural connection (physical and electrical) between each battery cell and module fixture should be stiff and robust. Many commodity cells do not include mechanical features that easily allow for such connections. For those that do, it is often difficult to make a stiff and robust mechanical connection while maintaining electrical connectivity requirements. Adhesives are able to establish high shear strength between smooth cell surfaces and fixtures of the module system while also maintaining any desired electrical isolation among the cells. However as noted above, adhesives can be expensive when used in this context and often lead to addition of an undesirable amount of mass to each battery module of a multiple-module battery pack. There is an additional cost to be considered, particularly as the number and density of elements in a module increases and still further as the number of these modules increases. This additional cost relates directly to long cure times often required of adhesives, and these long cure times increase process cost.

As noted above, in a closely packed battery module, the quantity of adhesive applied depends in part on the hydrostatic head required to drive wetting of the adhesive to the required bonding surfaces. Some methodologies apply 1-2 mL of adhesive (viscosity approximately 7000 cps) to bond each 18650 battery cell into its own shallow plastic counterbore provided in a fixture. This quantity of adhesive is considered a requirement to achieve coverage of all bonding areas. However, the actual quantity of adhesive required to fill each bonding area alone is approximately 0.050-0.100 mL. Consequently, when considering what is needed for bonding the battery cell to the module fixture alone, a large amount of the adhesive is wasted.

The standard adhesives used in conventional solutions that are outside the bonding areas serves little purpose once the adhesive has sufficiently wetted the bonding surfaces, and this "excess" adhesive has virtually no purpose in the finished product. Reducing a dependency on the hydrostatic head to wet the bonding surfaces in modularized assemblies has a potential to produce significant cost savings by eliminating the "wasted" adhesive.

What is needed is a method and apparatus for decreasing costs (expense, mass, and/or cure time) associated with use of adhesives when assembling modularized components.

BRIEF SUMMARY OF THE INVENTION

Disclosed are methods and systems for decreasing costs (expense, mass, and/or cure time) associated with use of adhesives when assembling modularized components, particularly for assemblies having many elements such as for example battery modules used in electric vehicles. The methods and systems enable use of high-wettability adhesives (defined generally in this application as low viscosity and/or low surface tension adhesives) for assembling such modularized components. A first method including (a) dispensing a high-wettability adhesive into a first module fixture populated with a plurality of elements wherein the first module fixture provides a plurality of bonding wells with each bonding well accepting a first portion of one or more of the elements with the module fixture including one more apertures communicated with one or more of the bonding wells, the adhesive being selectively curable upon application of a curing modality; (b) applying the curing modality selectively to a first portion of the dispensed adhesive in a seal zone, the seal zone including one or more regions surrounding the apertures wherein the dispensed adhesive in the seal zone is sufficiently cured to inhibit significant quantities of the adhesive from emerging from the apertures while the adhesive continues to be dispensed into the module fixture wherein the curing modality is not applied to a second portion of the adhesive outside of the seal zone; and (c) applying the curing modality to the second portion of the dispensed adhesive.

A high-wettability adhesive, for purposes of the present application, includes one-part and two-part adhesives having one or more wettability parameters, when considering a particular adhesive and the material of the substrate, selected from the group consisting of a viscosity in a range of about 100 to about 1000 centipoise, a surface tension with the substrate of the bonding wells producing a contact angle with the adhesive less than about ten degrees in air, and combinations thereof.

Another bonding method includes (a) populating a module fixture with a plurality of elements, the module fixture transparent to a curing modality; (b) masking selected areas of a first portion of the module fixture using a mask opaque to the curing modality producing an unmasked first portion of the module fixture and a masked first portion of the module fixture; and thereafter (c) dispensing a high-wettability adhesive into the populated module fixture, the adhesive being selectively curable upon application of the curing modality and wherein the first module fixture provides a plurality of bonding wells with each bonding well accepting a first portion of one or more of the plurality of elements with the module fixture including one more apertures communicated with one or more of the bonding wells, the adhesive being selectively curable upon application of a curing modality; (d) curing, during the dispensing step (c), a first portion of the dispensed adhesive in the unmasked first portion upon application of the curing modality to the first portion of the dispensed adhesive in the first portion without application of the curing modality to a second portion of the dispensed adhesive in the masked first portion; and thereafter (e) removing the mask; and thereafter (f) curing uncured dispensed adhesive in the module fixture, including the second portion of the dispensed adhesive, upon application of the curing modality to the module fixture.

A system includes a module fixture supporting a plurality of elements, the module fixture defining a plurality of bonding wells with each bonding well accepting a first portion of one or more of the elements with the module fixture including one or more apertures communicated with one or more of the bonding wells with the bonding wells having a nominal depth; and a dispensing system, coupled to the module fixture, for dispensing a high-wettability adhesive into each the bonding well and surrounding each the element substantially filling the bonding well up to the nominal depth without significant overfill, the adhesive being selectively curable upon application of a curing modality; and a curing structure for selectively exposing the adhesive to the curing modality as the adhesive emerges from the apertures during dispensation of the adhesive.

Assemblies, such as for example battery packs, composed of a large number of elements (e.g., cells) on the order of tens to hundreds to thousands or more elements, implementing preferred embodiments of the present invention preferably have a method of mechanical integration that is low cost in terms of expense, mass, and process time. The use of appropriate high-wettability adhesives permits a stiff, robust, electrically insulating mechanical connection to the battery module fixture. The high packing density of cells within a battery pack limits the room available for dispensing adhesive evenly throughout a battery module, however the high-wettability adhesive is better suited for even distribution, particularly when the module fixture is adapted with ramps, wicking channels, and guiding surfaces and the like to direct dispensing adhesive into all populated bonding wells. Features in the module fixture that allow electrical interconnects on both ends of each cell may provide potential leak pathways for the adhesive during dispensation. Curing modalities are applied to adhesive exiting from the apertures to seal the module fixture and allow the adhesive to continue to fill the bonding wells and wet the bonding surfaces around the elements populating the bonding wells. The high wettability adhesive efficiently fills the bonding wells around the elements to be bonded, permitting the bonding wells to be substantially filled without significant overfilling (that is, the bonding wells are filled sufficiently to wet all the bonding surfaces without excessive (significant non-structural use). Ports between the bonding wells, a use of ramped guiding surfaces, and other features of the fixtures promotes even distribution of the high-wettability adhesive. A curing modality is applied to all of the adhesive in the bonding wells after the bonding surfaces are properly wetted.

In some of the preferred embodiments, the curing modality includes application of light (e.g., ultraviolet radiation) which means that at least selected structures of the module fixture that define the bonding wells where the adhesive is dispensed (and where curing and bonding occurs) is transparent, and may therefore be visually inspected. A use of a cure indicator associated with the adhesive, such as color or some other visual cue, is advantageously used in certain embodiments to provide a quick assessment of the quality and/or status of the curing process in the bonding wells.

The embodiments of the present invention includes designs and methodologies that promote the use of a limited amount of high-wettability adhesive by selectively curing (e.g., UV-curing) the adhesive as it attempts to exit out of the apertures. As noted above, due to the high wettability, the application area may remain limited without disadvantage. The high-wettability adhesive means that a time until the bonding wells are filled and that wetting of all bonding surfaces has occurred is relatively short (in relative terms compared to conventional systems and absolute terms). In addition to the savings in process time, a total quantity of adhesive used is greatly reduced, removing mass and expense from the assembled module.

In some embodiments, after adhesive application and during wetting, the elements populating the bonding wells may be suitably positioned/aligned by use of a curing modality-transparent fixture applied to portions of the elements outside of the bonding wells of the fixture. For assemblies having multiple fixtures, this positioning/aligning fixture may be one of the other fixtures of the final assembly. (For multiple fixture assemblies, and because the preferred embodiments use high-wettability adhesives that respond strongly to gravity, any particular fixture being processed (e.g., populated, filled, and some amount of curing) is often described as a bottom fixture. It has this orientation during processing, even in cases that the fixtures may be oriented differently during operation. This is not to say that other orientations and arrangements are excluded, for example some application may be found for dispensing adhesive in a centrifugal system in which a "bottom" fixture would be one having a greater angular velocity than any other fixtures, with the high wettability adhesive dispensed from closer to a center of rotation of the system and flowing outward into the bonding wells and potentially leaking from the apertures, with the selective curing occurring on the periphery of the system.)

Curing modality (e.g., UV radiation) is applied to the adhesive by directing the UV radiation to the top side of the positioning/aligning assembly, curing the adhesive in the bonding areas of the bottom fixture. In embodiments having some areas shadowed by internal structures that limit exposure of some portions of the adhesive to the curing modality, the adhesive may include a multi-stage curing process. A first stage designed to cure the adhesive in seconds in response to one curing modality (e.g., UV radiation) and a second stage to cure the adhesive over a longer period in response to another curing modality (e.g., days at room temperature). This creates a two stage curing process for two sets of mechanical requirements, one for completing the remaining manufacturing steps and the other for durability in the field. While the adhesive joints are strengthened sufficiently by the UV radiation to continue on the manufacturing line, full strength as required for field durability may not be developed for days or weeks. When the module fixture itself is UV transparent, the entire cure operation can occur within seconds.

There may be many different implementations of embodiments of the present invention including permutations of one-part and two-part adhesives with single-stage or multi-stage curing or sealing formulations, with the staging being during dispensing and/or curing. For example, one embodiment includes use of a two-part high-wettability adhesive that "gels" or "skins" upon application of a sealing modality while curing in a more conventional manner. The gelling creates a barrier and seals the apertures preventing leaks and permitting the adhesive to fill the bonding wells and wet the bonding surfaces. In other applications, it is possible to vary the adhesive properties during dispensing such that a first phase adhesive is particularly formulated to enhance the sealing properties by interaction with a curing/sealing modality while a second phase of adhesive being dispensed is particularly formulated to bond the fixture to the elements.

DETAILED DESCRIPTION OF THE INVENTION

Embodiments of the present invention provide methods and systems for decreasing costs (expense, mass, and/or cure time) associated with use of adhesives when assembling modularized components by enabling use of high-wettability adhesives. The following description is presented to enable one of ordinary skill in the art to make and use the invention and is provided in the context of a patent application and its requirements. In the following text, the terms "battery", "cell", "battery cell" and "battery cell pack" may be used interchangeably and may refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. Further, the term "high-wettability," when considering a particular adhesive and material of the substrate, an adhesive having a characteristic selected from the group consisting of a viscosity in a range of about 0 (more preferably 100) to about 1000 centipoise, a surface tension with the substrate producing a contact angle with the adhesive less than about ten degrees in air, and combinations thereof. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Adhesives have been formulated to selectively cure in response to some curing modality, such as ultraviolet (UV) radiation. Selective curing permits control of timing and location of curing. Formulations also exist that permit for use of a secondary curing modality, such as time or temperature. This, combined with high-wettability adhesives formulated to have a low viscosity and/or low surface tension, with suitable design of a module fixture, provide a method and apparatus for enabling use of such adhesives for assembling modularized components, such as battery modules that provide lower cost, lower mass, and requires a shorter adhesive working time than conventional systems.

Figure 1:
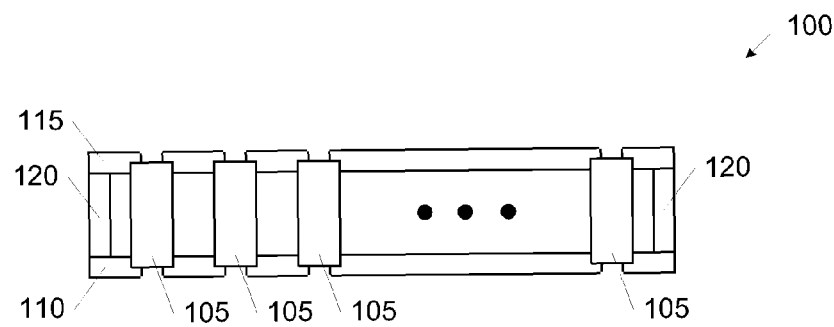
FIG. 1 is a block diagram of a system.

FIG. 1 is a block diagram of a system 100 including a plurality of bonded elements 105 supported by a bonding module fixture including a first module fixture element 110, a second module fixture element 115, and an optional supporting element 120 interconnecting element 110 and element 115 in cases where additional structural support is not otherwise provided. System 100 is lower cost (e.g., lower expense, lower mass, and/or production time) as compared to conventional systems. While the present invention may be adapted for bonding many different types of elements 105, the invention will be described with reference to formation of a battery cell module made up of a large number (e.g., hundreds to thousands) of battery cells as element 105. Depending upon the implementation and the type of element, one or more module fixtures 110 are used to locate, bond, and secure elements 105. For the present example, two module support structures are described, it being understood that fewer or more module support structures may be used. Also in the following description, high-wettability adhesives are used. Gravity is effectively used to move uncured and dispensed adhesive, so there is reason to have references of lower and upper when describing the embodiments of the present invention. Such a reference does not necessarily relate to the orientation of intermediate or final products, but only to an orientation during dispensing, wetting, and at least some curing of the adhesives.

Figure 3:
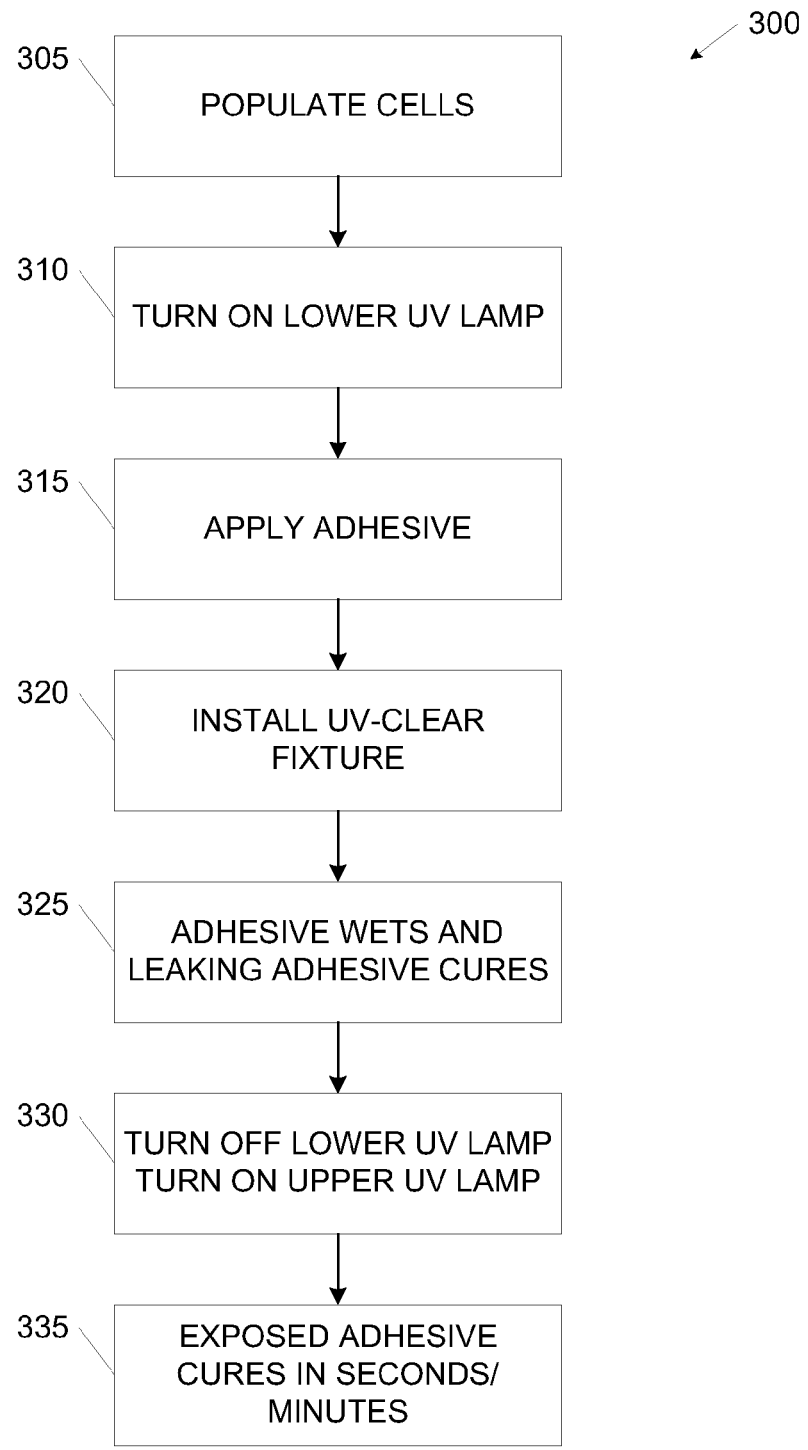
FIG. 3 is a flowchart of a first preferred process.

There are at least two general operational methods described herein, see for example, the discussion below regarding FIG. 3 and FIG. 4. FIG. 3 generally describes a two-part adhesive method and FIG. 4 generally describes a one-part adhesive. Some of the descriptions in one method are applicable to the other.

The adhesives described herein for use are selectively curable low viscosity and/or low surface tension adhesives. For purposes of the present invention, low viscosity means an adhesive in a range of about 0-2000 centipoise, preferably about 50-1000 centipoise, and most preferably a range of about 100-500 centipoise. For purposes of the present invention, low surface tension means an adhesive, when measuring a contact angle between the adhesive relative to a material of a substrate (e.g., the bonding surface in the bonding well) in air, the contact angle is less than about 30 degrees, preferably less than about 10 degrees, and most preferably less than about 5 degrees.

The adhesives are also selectively curable upon application of a curing modality. The curing modality used in the preferred embodiments includes UV curing, but other curing modalities may be used, with some adjustment of the systems and methods described herein. These alternate curing modalities may include, for example, application of/exposure to an electron beam, peroxide, cationics, amines, hydroxyl groups, thermal radiation, and combinations thereof. In the context of the present invention, unless otherwise contradicted by the context, selective cure also includes selective "gelling" such that an adhesive may not cure as that term is generally understood, but it may harden/gel sufficiently to seal apertures and inhibit exit or flow of adhesive.

Suitable two-part adhesives include those adhesives having a resin with a hardener such that it cures over time such as an epoxy-amine adhesive system or other secondary curing modality (e.g., thermal energy). Other suitable adhesives will be one-part adhesives that cure in response to exposure/application of a single primary curing modality.

Other terms used in the present describe module fixtures that have curing modality transparency (which refers to a property of the module fixture that it does not block or significantly impair exposure/application of the curing modality to the relevant adhesive. In some cases, optional channels or "spigots" are provided in the module fixture to permit or promote passage and distribution of the curing modality throughout the structure or to selective other regions or portions of the structure. The present application also uses the term "curing enclosure" as a reference to an immersive source of the curing modality to expose/apply the curing modality to large areas of the adhesive. For example, a UV oven is an example of a curing enclosure for a UV curing modality.

Figure 2:
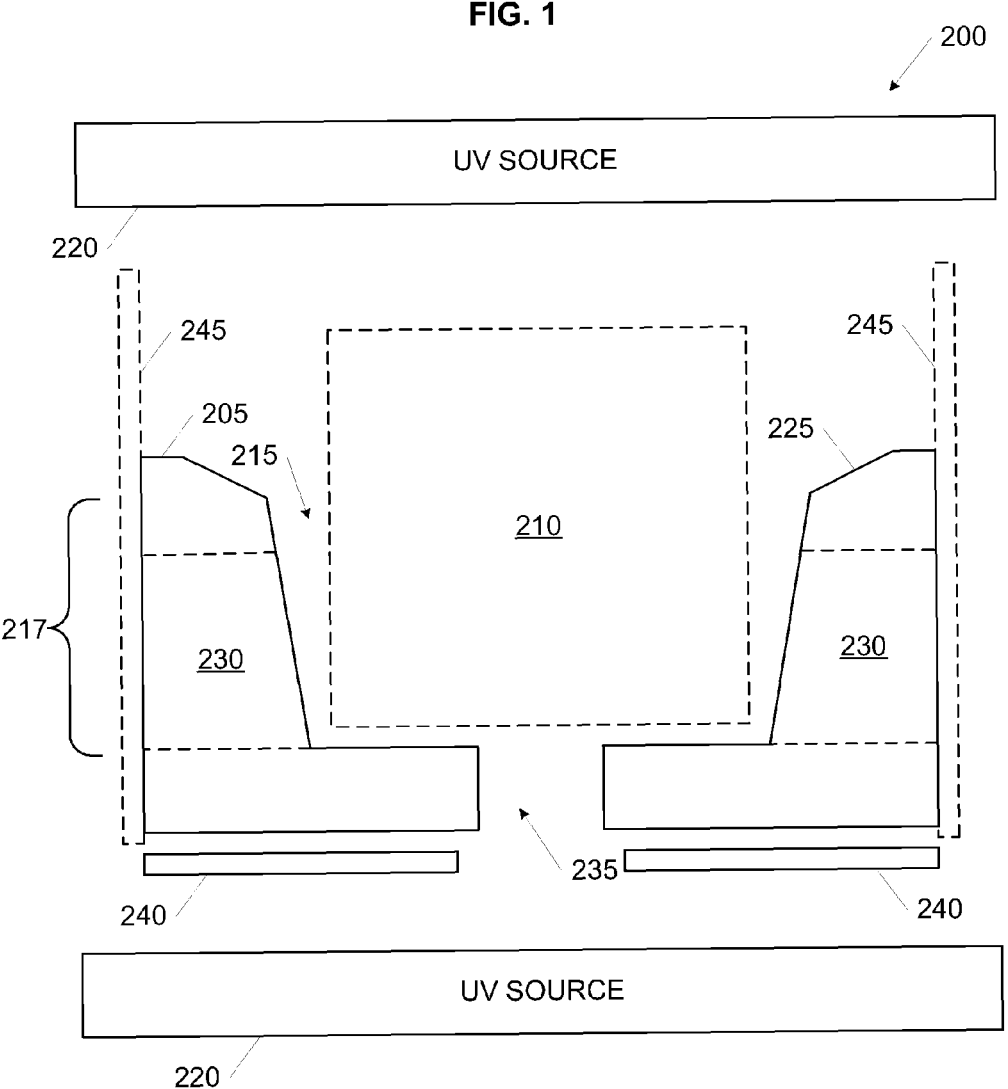
FIG. 2 is a detailed view of a battery cell in a module fixture.

FIG. 2 is a detailed view of a portion 200 of a module fixture 205 supporting a battery cell 210 (not to scale). Module fixture 205 defines a bonding well 215 that receives cell 210, a space between a wall of well 215 and cell 210 being filled with high-wettability adhesive, preferably up to a nominal fill depth 217 without significant overfilling. For purposes of this application, overfilling relates to dispensation of a quantity adhesive in excess of structural purposes. A total amount of dispensed adhesive in a manufacturing environment is subject to normal variations. A goal of the present invention is to reduce a total amount of adhesive by permitting elimination\reduction of overfill. The embodiments of the present invention provide solutions to reducing any overfilling of the bonding wells, but some overfill will be acceptable or desirable in some implementations. A marginal utility of extra adhesive, in a structural sense, begins to decline at the point overfilling begins. This is a preferred reference for beginning a determination as to whether a bonding well has been overfilled.

The relative dimensions between walls of fixture 205 and cell 210 are exaggerated in FIG. 2 and the space is actually much smaller. It is possible to limit the quantity of adhesive in this fashion because of the high-wettability adhesives used in the present invention combined with the selective curing herein described. The detail of FIG. 2 is repeated laterally for each cell 210 to form an entire matrix of battery cells closely packed together.

Dispensed adhesive in bonding well 215 surrounding cell 210 is selectively cured by exposure/application of a curing modality from a source, for example, a UV source 220 (source 220 may be implemented in one or more locations, such as, for example, as shown with a lower UV lamp and an upper UV lamp). Source 220 may also be implemented as a single UV lamp in each location or include several structures, such as for example, a matrix of small sources, with one small source corresponding to each bonding well 215 location. Structure 205 is formed with ramps 225 and channels 230 to aid in flowing dispensed adhesive into all bonding wells 215 to wet all bonding surfaces of structure 205 and cell 210.

Those regions of the module fixture, particularly around the apertures and bottoms of the bonding wells define a seal zone. The exposure of selectively curable adhesive as it enters the seal zone to form a barrier against further adhesive exit is one of the features of the present invention that enables use of high-wettability adhesive. In some implementations, the seal zone is spatially-crafted to form a particular three-dimensional region. For example, when the curing modality includes application of ultraviolet radiation, one or more beams of UV light may be focused, dispersed, or otherwise crafted for desired effect. In a case of using UV LEDs for producing the curing modality into the seal zone, some implementations advantageously produce a conical beam for parts of the seal zone near fixture apertures. Shaping portions of the seal zone in this way can offer other advantages for later processing of the module.

The dispensed adhesive, being a high-wettability adhesive, will begin to "leak" from areas in a wall of module fixture 205, such as a connection port 235 in bonding well 215 underneath cell 210, such as may be used for an electrical interconnect. As the adhesive begins to emerge, it is cured almost instantly, thereby sealing the aperture against further loss of adhesive and permitting the dispensed adhesive to fill bonding well 215, while also maintaining an ability to make electrical/mechanical contact with cell 210.

Some embodiments include one or more masks 240 that block exposure/application of the curing modality from selected areas of fixture portion 200. Other embodiments include curing modality channels 245 or spigots that direct and/or promote distribution/redistribution of the curing modality throughout selected regions of the module fixture. One or more of adhesive channels 230, masks 240, and light channels 245 are optional elements used as necessary or desirable in implementing embodiments of the present invention.

FIG. 3 is a flowchart of a first preferred process 300. Process 300 preferably uses a two-part adhesive having two-stage curing: a UV cure and a time cure. Process 300 uses a UV-opaque module fixture. In general, process 300 includes populating the battery cells into a first module fixture 305. This is similar to a tray holding fifty or more upright battery cells seated within the bonding wells described above.

The UV source is turned on (step 310). One preferred embodiment provides for two UV sources, a lower UV source that is "under" the UV-opaque module support structure and an upper UV source that is "over" the UV-opaque module support structure. Step 310 turns on the lower UV source, in this case, a UV lamp.

Step 315 of process 300 applies the high-wettability adhesive. Because of its properties, it begins to flow readily and begins to wet the bonding surfaces in the bonding wells. Process 300 includes an optional step 320 that installs a UV-clear fixture onto tops of the battery cells. The first module fixture supports/holds/bonds one end of the battery cells. The battery cells may not be sufficiently aligned vertically with vertical axes of the bonding wells. Additionally, until the adhesive cures sufficiently, there is some risk of one or more of the battery cells becoming misaligned. One of the advantages of the present invention over conventional systems is a relatively quick curing time, which permits post-adhesive-application assembly processing to continue sooner than when conventional systems are employed. Such processing may tend to disturb the preferred location/alignment of the cells. The fixture of step 320, when used, is designed to locate and hold a second end of the cells during adhesive application and/or post-adhesive-application processing while the adhesive suitably cures. In some cases, the second fixture improves the tolerance of the assembly. This fixture may be a temporary structure or may be a permanent structure, such as the opposing module fixture to be permanently affixed to the second end of the battery cells.

In step 325, the applied adhesive wets the bonding areas and some portion of the applied adhesive emerges from the bottom of the structure, such as at various apertures communicated to the bonding wells, such as around connector vias and other features and ports. Emerging adhesive is immediately exposed to the curing modality (e.g., optical communication with the UV radiation from the lower UV lamp) and cures within a matter of a few seconds to a few minutes, depending upon implementation details. The cured adhesive seals the apertures and inhibits additional exit of the adhesive, which in turn permit the adhesive to fill the bonding well and wet all of the desired bonding surfaces. Because the module fixture is UV-opaque, the lower UV lamp is not generally in optical communication with adhesive within the bonding well. The module fixture is designed to direct the majority of the applied adhesive to the bonding surfaces between the battery cells and module fixture through the use of ramps and/or channels and other structures.

Step 330 turns off the lower UV source and turns on the upper UV source. The upper UV source applies the curing modality to the top of the dispensed adhesive to cure it as well. The UV-opaque module fixture inhibited the curing modality from the lower UV source to cure the adhesive within the bonding well, thereby permitting it to flow and wet all desired bonding surfaces. The upper UV lamp cures the adhesive in the bonding well from the "top" side of the UV opaque module fixture. The curing modality from the upper lamp is applied through the UV-clear fixture should it have been installed.

Step 335 cures the adhesive exposed by the upper UV source in a matter of a few seconds to minutes. Thereafter, further mechanical processing of the module may begin. Any shadowed adhesive (e.g., any adhesive not exposed to the curing modality) will cure over the next days or weeks. As described above, the UV radiation was the primary curing modality. The two-part adhesive preferably used in the process 300 includes a secondary curing modality—time (e.g., responsive to a hardener used in the adhesive) or application of thermal radiation. (The post-exposed module may be heated in the latter case to finish the curing of shadowed adhesive. In some implementations it is sufficient to let the adhesive sit and cure over time.)

Battery cells sometimes include a shrink wrap cover. Populating the fixtures with battery cells lacking such shrink wrap has an advantage in some embodiments. For example, battery cells lacking the shrink wrap exposes UV-reflective nickel-plated steel cases of a certain type of cells. The steel cases of these cells may be used, as necessary or desired, to facilitate UV penetration and redistribution of the curing modality throughout the closely packed cells to the bonding areas. In addition, a draft of the bonding well in the mechanical structure may be increased to allow better optical access to the full bonding area. Once the bonding surfaces are wetted by the adhesive, the fixtured module may be placed in a UV oven to cure the exposed adhesive in all the bonding areas throughout the assembly. This UV cure provides a first stage of mechanical strength to continue with subsequent manufacturing operations. Over the following days or weeks, adhesive that was shadowed during the initial UV exposure cures with time at room temperature.

Process 300 may also be used on the second side of the battery module, with the exception that the primary UV cure may be applied through ports in the bottom piece of module fixture. UV emitting "spigots" may extend through the ports and fully cure some sections while "skin curing" the majority of the adhesive such that the module may be tipped or flipped in further handling.

Figure 4:
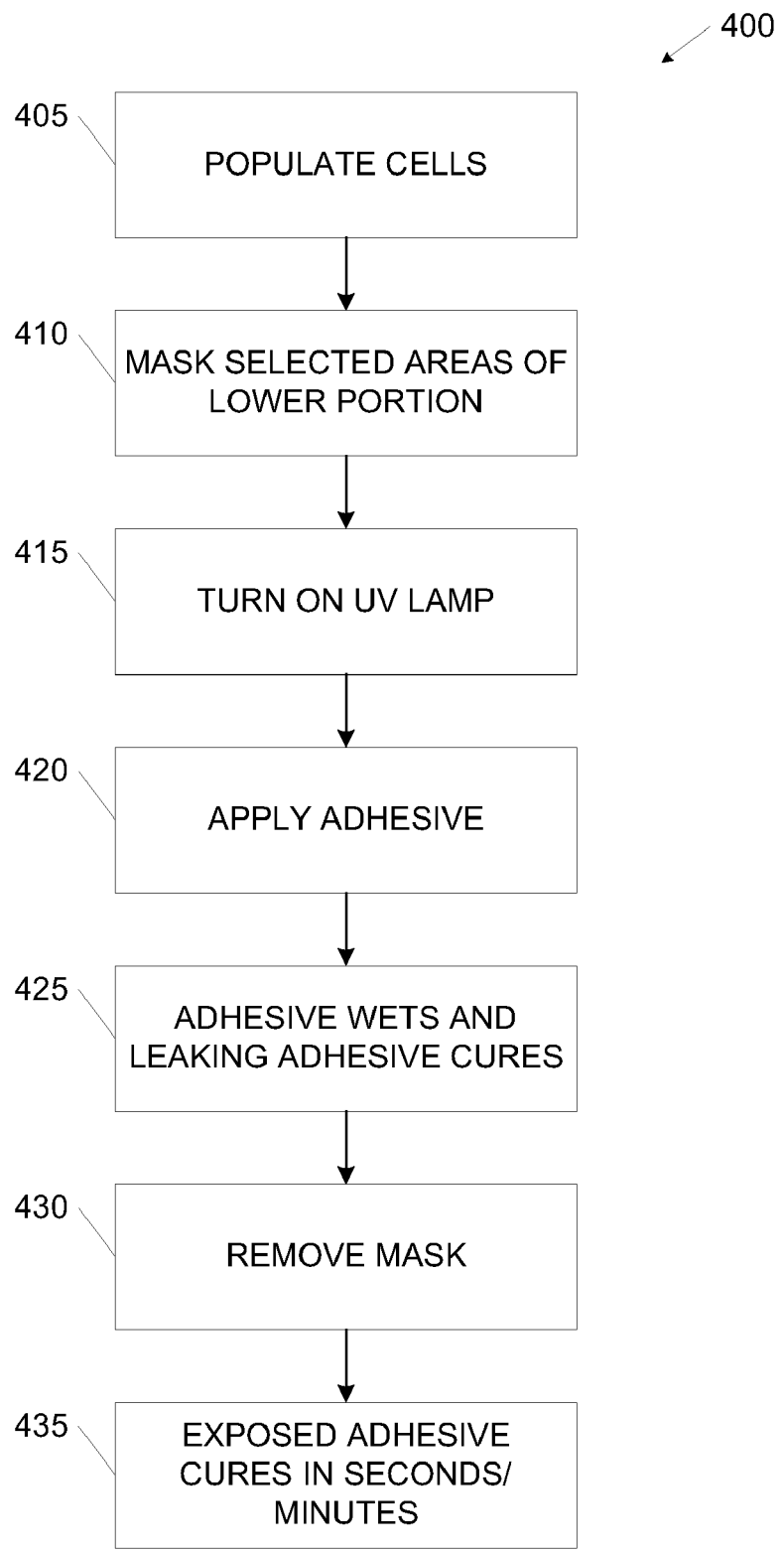
FIG. 4 is a flowchart of a second preferred process.

FIG. 4 is a flowchart of a second preferred process 400. Process 400, similar in many respects to process 300 described herein, preferably uses a UV-clear module fixture and a one-part UV curing adhesive. One-part adhesives are advantageous for manufacturing as compared to two-part adhesives because two-part adhesives require disposal or cleaning of equipment that comes into contact with the mixed two-part adhesive.

In process 400, the cells are populated into the UV-clear module fixture (405) and the structure is closed. All areas on the bottom of the module except where adhesive may exit from the bottom of the structure are masked by a UV-opaque plate or barrier (410). A UV source (e.g., a single lamp exposing all unmasked areas or many UV LEDs of an LED-matrix, one LED for each aperture) is turned on (415) and adhesive applied (420) that wets the bonding surfaces and begins to exit from the various apertures communicated to the bonding wells. During wetting, the bottom of the assembly is exposed to UV light from the UV source(s), curing adhesive as it attempts to exit from the apertures in the bottom (425). After wetting, the mask is removed (430), and the entire assembly is exposed to UV light, penetrating the structure and curing the adhesive (435) throughout. At this point, when necessary or desirable, the assembly is opened for additional operations. Once these are complete, the assembly is once again closed, and the above process is repeated for the other side of the enclosure. The assembly is now UV cured on both sides.

Figure 5:
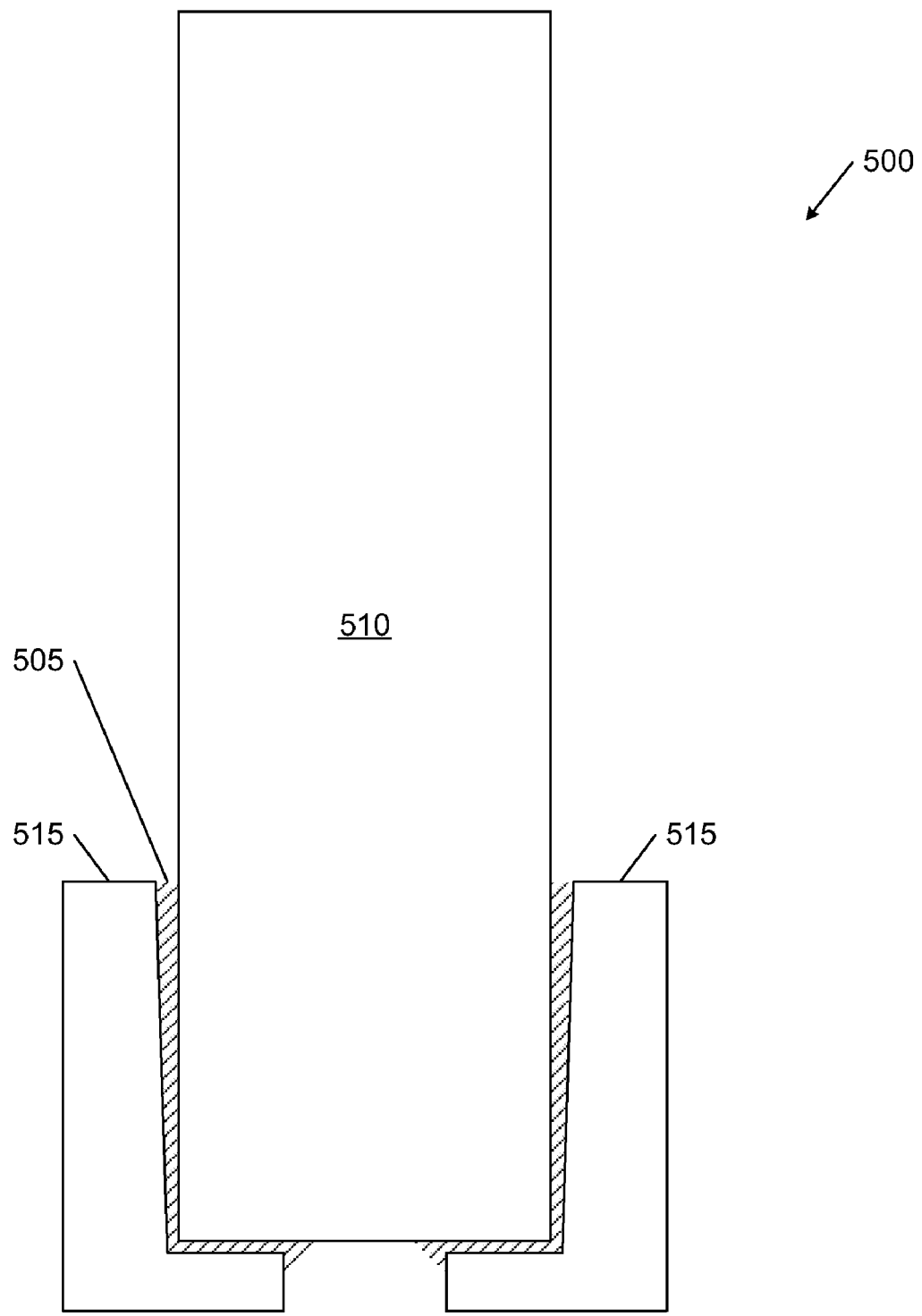
FIG. 5 is a detail of a side view of a representative bonding area between a battery cell and a module fixture.

FIG. 5 is a detail of a side view of a portion 500 of a cured module fixture of a representative bonding area 505 between a battery cell 510 and a module fixture wall 515. Portion 500 is a better representation of the scale of the boding surfaces wetted and cured by the present invention. The adhesive is shown in cross-hatched shading, illustrating that the preferred implementation limits escape of the adhesive out the bottom and fills the bonding wells without overfilling. In a manufacturing environment, it can be difficult to dispense the precise quantity of adhesive, sometimes the bonding well is not completely filled or sometimes it is overfilled. Underfilling is undesirable as it reduces a strength of the bonding while overfilling is undesirable because of the extra cost. A goal is to achieve an amount of adhesive generally represented by the elements shown in FIG. 5, with the understanding that more or less adhesive may be actually used.

A modification of the disclosed embodiments includes use of a two-phase dispensing of adhesive. In a first phase, an adhesive formulated to be highly wetting while being quickly "skinned" is dispensed and then in a second phase a structural adhesive is dispensed. The first phase adhesive primary objective is to create a barrier around the apertures to seal the fixture and stop the second phase adhesive from exiting.

The system above has been described in the preferred embodiment of multicell battery pack used in electric vehicle (EV) systems. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A bonding method, the method comprising the steps of:
   (a) dispensing a high-wettability adhesive into a first module fixture populated with a plurality of elements wherein said first module fixture provides a plurality of bonding wells with each bonding well accepting a first portion of one or more of said elements with said module fixture including one more apertures communicated with one or more of said bonding wells, said adhesive being selectively curable upon application of a curing modality;
   (b) applying said curing modality selectively to a first portion of said dispensed adhesive in a seal zone, said seal zone including one or more regions surrounding said apertures wherein said dispensed adhesive in said seal zone is sufficiently cured to inhibit significant quantities of said adhesive from emerging from said apertures while said adhesive continues to be dispensed into said module fixture wherein said curing modality is not applied to a second portion of said adhesive outside of said seal zone; and
   (c) applying said curing modality to said second portion of said dispensed adhesive, wherein said dispensed adhesive includes a plurality of wettability characteristics during dispensing with said first portion of said adhesive having a different wettability than said second portion of said adhesive, and
   wherein said module fixture includes a first battery fixture clamshell and a second battery fixture clamshell, said plurality of elements include a plurality of battery cells, said bonding wells formed from counterbores in said clamshells with said portions of said batteries accepted within said counterbores including an end of said battery cell and wherein each counterbore populated with an end of one of said battery cells has a portion of a wall of said clamshell defining a contact port aperture communicated to said counterbore allowing electrical communication to said end of said battery cell from outside said clamshell.

2. The bonding method of claim 1 wherein said adhesive includes one or more wettability parameters selected from the group consisting of a viscosity in a range of about 0 to about 2000 centipoise, preferably about 50 to about 1000 centipoise, and most preferably about 50 to about 500 centipoise, a surface tension with a substrate of said bonding wells producing a contact angle with said adhesive less than about 30 degrees in air, preferably less than about 10 degrees in air and most preferably less than about 5 degrees in air, and combinations thereof.

3. The bonding method of claim 1 wherein said plurality of bonding wells accepting said portions of said one or more elements has a nominal depth and wherein said adhesive fills said plurality of bonding wells up to about said nominal depth without substantial overfilling of said bonding wells.

4. The bonding method of claim 1 including a first bonding sequence and a second bonding sequence after said first bonding sequence wherein said dispensing step a) includes a step a1) dispensing said adhesive into said first clamshell and a step a2) dispensing said adhesive into said second clamshell and said first portion adhesive applying step b) includes a step b1) applying said curing modality selectively to a first portion of said dispensed adhesive in a seal zone in said first clamshell and a step b2) applying said curing modality selectively to a first portion of said dispensed adhesive in a seal zone in said second clamshell with said first bonding sequence including step a1) and step b1) and said second sequence including step a2) and step b2).

5. The bonding method of claim 4 wherein said seal zones in step b1) include said bonding wells in said first fixture and exclude bonding wells in said second fixture and said seal zones in step b2) include said bonding wells in said second fixture and may include seal zones of said first fixture.

6. The bonding method of claim 1 wherein said wettability of said second portion is greater than said wettability of said first portion.

7. The bonding method of claim 1 wherein said wettability of said second portion is less than said wettability of said first portion.

8. The bonding method of claim 1 wherein said selectively curable adhesive is curable upon exposure to ultraviolet radiation and said curing modality includes selective application of ultraviolet radiation to said identified portions of said dispensed radiation.

9. The bonding method of claim 1 wherein said selectively curable adhesive is curable upon exposure to one or more modalities selected from the group consisting of ultraviolet, electron beam, peroxide, cationic, amine, hydroxyl groups, thermal, and combinations thereof and said curing modality includes application of selected one or more modalities to said identified portions of said dispensed radiation.

10. The bonding method of claim 1 wherein said module fixture includes adhesive guiding structures directing said dispensing adhesive to a plurality of bonding surfaces in said plurality of bonding wells between said portions of said plurality of elements and said fixture.

11. The bonding method of claim 10 wherein said adhesive guiding structures include one or more structures selected from the group consisting of ramps, channels, counterbores, sloped walls, and combinations thereof.

12. The bonding method of claim 1 further comprising the step of (d) applying a modality-transparent fixture to a second portion of said plurality of elements different from said first portion, said modality-transparent fixture coupled to said second portion of said plurality of elements during a wetting of said plurality of elements by said dispensed adhesive.

13. The bonding method of claim 12 further comprising the step of (e) curing said module fixture and said modality-transparent fixture in a curing enclosure that applies said curing modality to all exposed dispensed adhesive.

14. The bonding method of claim 1 wherein a portion of an external surface of each of said plurality of elements includes a curing modality redirecting component for redirecting said curing modality into a body of said module fixture that promotes an inter-element bonding.

15. The bonding method of claim 1 further comprising a second module fixture populated with said plurality of elements wherein said second module fixture provides a plurality of bonding wells with each bonding well accepting a second portion of said one or more of said elements with said second module fixture including one more apertures communicated with one or more of said bonding wells in said second module fixture, the method further comprising the steps of:
(d) dispensing said adhesive into said second module fixture after said steps (a)-(c);
(e) applying said curing modality selectively to a third portion of said dispensed adhesive in a second seal zone, said second seal zone including one or more regions surrounding said apertures of said second module fixture wherein said dispensed adhesive in said second seal zone is sufficiently cured to inhibit significant quantities of said adhesive from emerging from said apertures while said adhesive continues to be dispensed into said module fixture during step d) wherein said curing modality is not applied to a fourth portion of said adhesive outside of said second seal zone but may include application of said curing modality to portions of said adhesive in said seal zone of said first module fixture; and
(f) applying said curing modality to said fourth portion of said dispensed adhesive.

16. The bonding method of claim 1 wherein said adhesive includes an indicator disposed in said seal zone with said indicator representing a state of cure of said adhesive.

17. The bonding method of claim 1 wherein said module fixture is transparent to said curing modality with said seal zone defined by a mask opaque to said curing modality.

18. A bonding method, the method comprising the steps of:
(a) populating a module fixture with a plurality of elements, said module fixture transparent to a curing modality;
(b) masking selected areas of a first portion of said module fixture using a mask opaque to said curing modality producing an unmasked first portion of said module fixture and a masked first portion of said module fixture; and thereafter
(c) dispensing a high-wettability adhesive into said populated module fixture, said adhesive being selectively curable upon application of said curing modality and wherein said first module fixture provides a plurality of bonding wells with each bonding well accepting a first portion of one or more of said plurality of elements with said module fixture including one more apertures communicated with one or more of said bonding wells, said adhesive being selectively curable upon application of a curing modality;
(d) curing, during said dispensing step (c), a first portion of said dispensed adhesive in said unmasked first portion upon application of said curing modality to said first portion of said dispensed adhesive in said first portion without application of said curing modality to a second portion of said dispensed adhesive in said masked first portion; and thereafter
(e) removing said mask; and thereafter
(f) curing uncured dispensed adhesive in said module fixture, including said second portion of said dispensed adhesive, upon application of said curing modality to said module fixture,
wherein said dispensed adhesive includes a plurality of wettability characteristics during dispensing with said first portion of said adhesive having a different wettability than said second portion of said adhesive, and
wherein said module fixture includes a first battery fixture clamshell and a second battery fixture clamshell, said plurality of elements include a plurality of battery cells, said bonding wells formed from counterbores in said clamshells with said portions of said batteries accepted within said counterbores including an end of said battery cell and wherein each counterbore populated with an end of one of said battery cells has a portion of a wall of said clamshell defining a contact port aperture communicated to said counterbore allowing electrical communication to said end of said battery cell from outside said clamshell.

* * * * *